(12) United States Patent
Dehghan et al.

(10) Patent No.: US 8,462,751 B1
(45) Date of Patent: Jun. 11, 2013

(54) MANAGING WIRELESS LOCAL AREA NETWORKS

(75) Inventors: Hossein Dehghan, Danville, CA (US); Sam Heidari, Los Altos Hills, CA (US)

(73) Assignee: Quantenna Communications Inc., Fremont, CA (US)

( * ) Notice: Subject to any disclaimer, the term of this patent is extended or adjusted under 35 U.S.C. 154(b) by 0 days.

(21) Appl. No.: 13/466,328

(22) Filed: May 8, 2012

Related U.S. Application Data

(60) Provisional application No. 61/601,533, filed on Feb. 21, 2012.

(51) Int. Cl.
*H04W 4/00* (2009.01)

(52) U.S. Cl.
USPC .......................................... 370/338; 709/226

(58) Field of Classification Search
USPC .......................................... 370/338; 709/226
See application file for complete search history.

(56) References Cited

U.S. PATENT DOCUMENTS

| | | | |
|---|---|---|---|
| 7,512,379 B2 | 3/2009 | Nguyen | |
| 2003/0046396 A1* | 3/2003 | Richter et al. | 709/226 |
| 2008/0181173 A1* | 7/2008 | Wei | 370/329 |
| 2009/0305650 A1* | 12/2009 | Wenger et al. | 455/88 |
| 2011/0116458 A1* | 5/2011 | Hsu et al. | 370/329 |
| 2012/0092211 A1* | 4/2012 | Hampel et al. | 342/175 |

* cited by examiner

*Primary Examiner* — Wei Zhao
(74) *Attorney, Agent, or Firm* — IP Creators; Charles C Cary

(57) ABSTRACT

A geolocation utilization manager for managing wireless local area networks (WLAN) each supporting wireless communications between an associated access point node and associated station nodes on a corresponding one of a plurality of communication channels. The geolocation utilization manager for aggregating channel utilization information from the WLANs, and consolidating channel usage between neighboring underutilized ones of the WLANs, thereby maximizing utilization of a shared channel between neighboring underutilized ones of the WLANs. Whereby underutilized neighboring WLANs otherwise utilizing unique channels instead share a single channel, thereby freeing up other communication channels across an available WiFi, IEEE 802.11 or other such spectrum.

15 Claims, 8 Drawing Sheets

FIG. 1
PRIOR ART Interference Detection results in Unique Channels
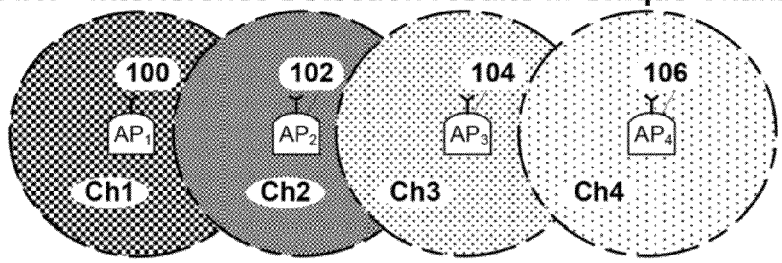
Sharing a Channel between Under-Utilized Neighboring Networks
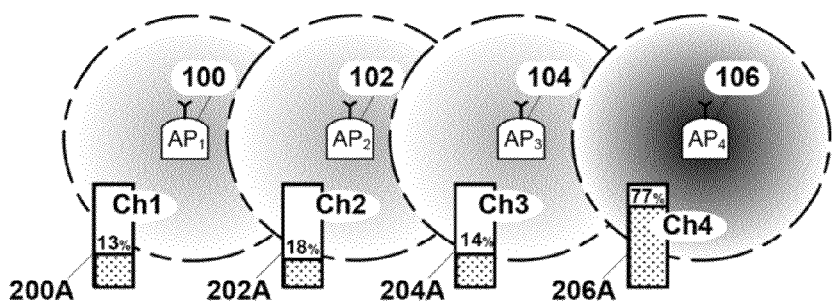
FIG. 2A
FIG. 2B
Consolidate all Neighboring Networks on Shared Channel
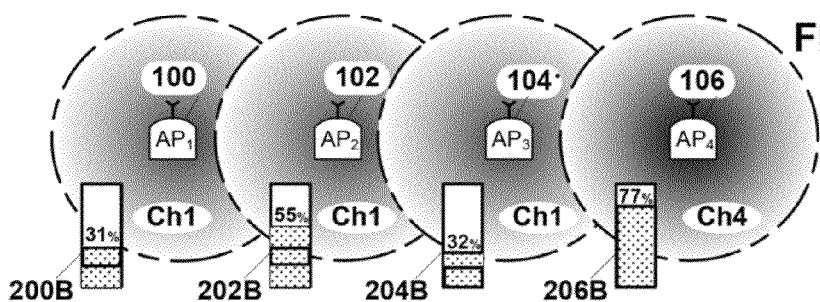
FIG. 2C

Share Channel between Highly-Utilized Neighboring Networks with Isolated Communication Links

Maximize Channel Utilization across Networks with Isolated Links FIG. 3B

Consolidate all Neighboring Networks on a Shared Channel

Share Channel between Highly-Utilized Neighboring
Networks with Isolated Communication Links
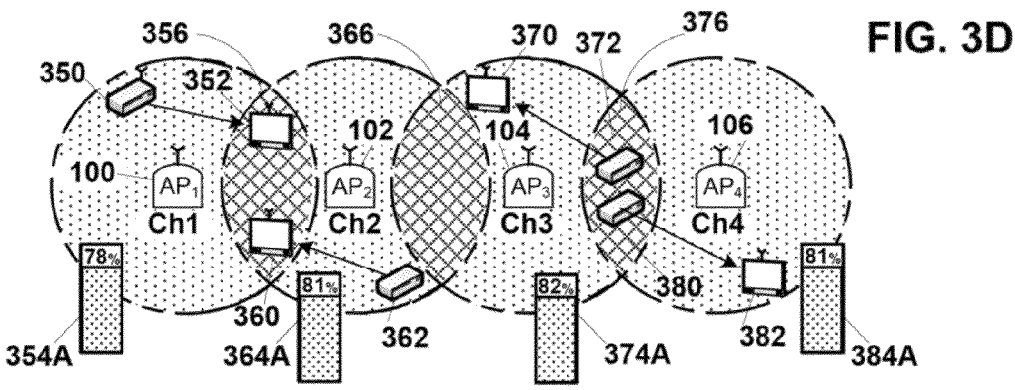
FIG. 3D
Maximize Channel Utilization across Networks with Isolated Links
FIG. 3E
Consolidate selected Neighboring Networks on Shared Channel
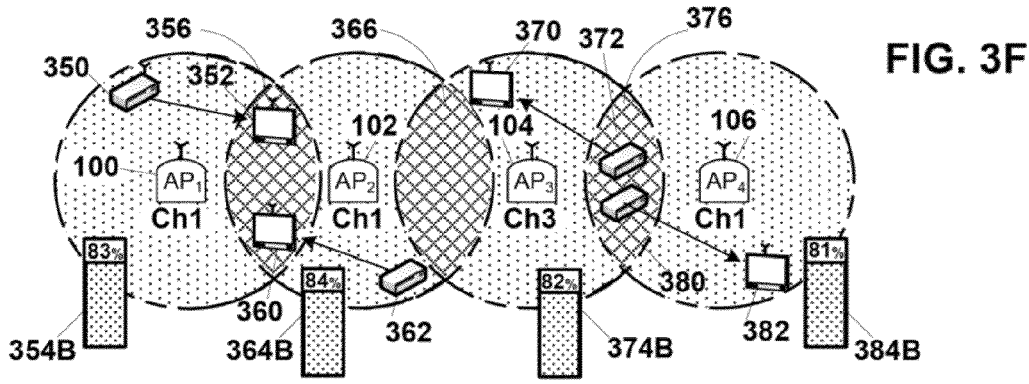
FIG. 3F Smallville Wi-Fi Coverage

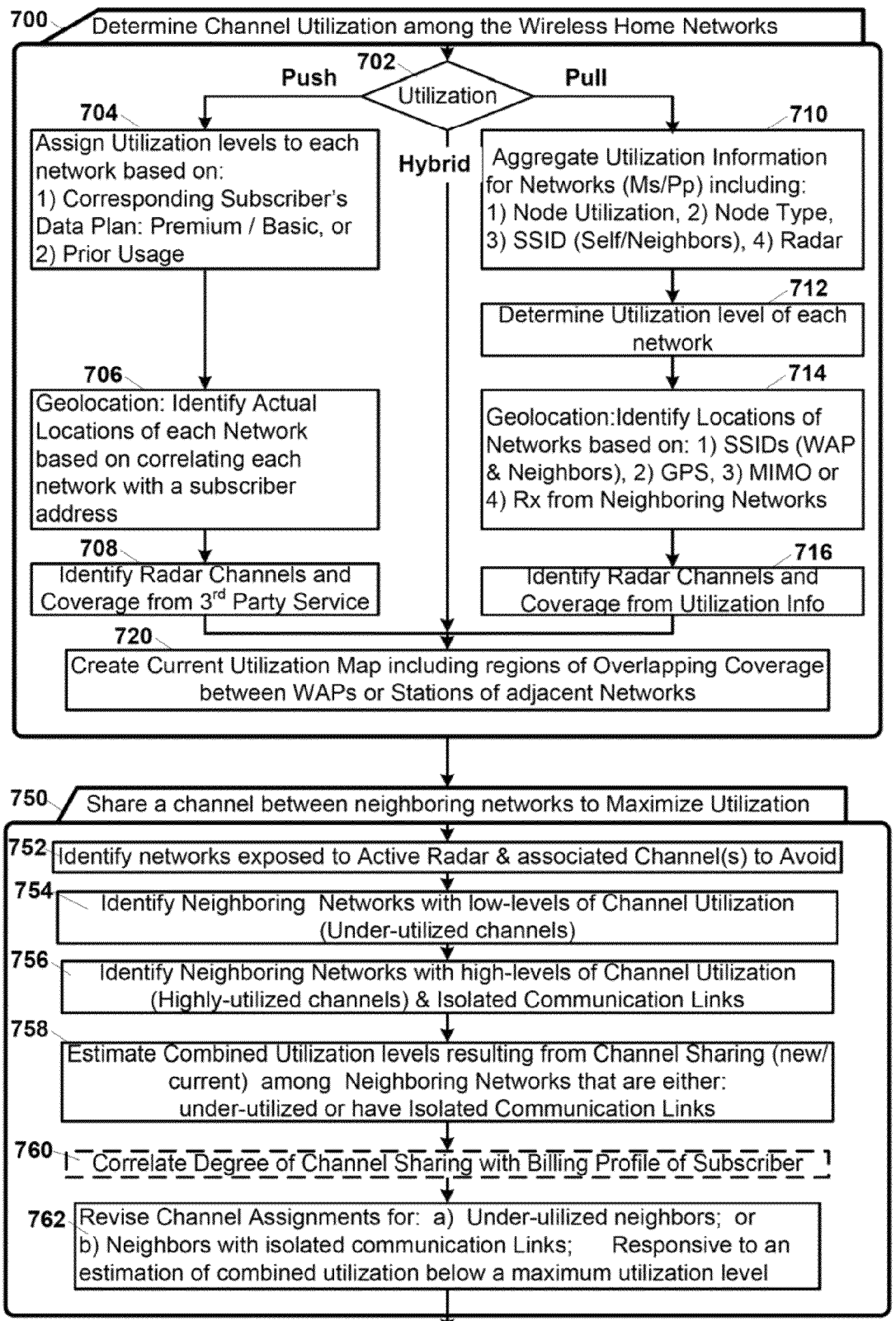
FIG. 7 Managing Wireless Home Networks

MANAGING WIRELESS LOCAL AREA NETWORKS

CROSS REFERENCE TO RELATED APPLICATION

This application claims the benefit of prior filed Provisional Applications No. 61/601,533 filed on Feb. 21, 2012 entitled "Managing Wireless Home Networks" which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and methods for managing same.

2. Description of the Related Art

Home and office networks, a.k.a. wireless local area networks (WLAN) are increasingly set up and serviced using a device called a Wireless Access Point (WAP). The WAP may include a router. The WAP couples all the devices of the home network, e.g. wireless stations such as: computers, printers, televisions, digital video (DVD) players and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a single channel. Each home has a WAP which forms the center piece of the associated wireless networking between all the wireless enabled devices in the home, a.k.a. wireless stations or wireless network nodes. The WAP self-selects one of a number of channels on which its network nodes or devices will communicate. The choice of Channel by each WAP is based on avoiding interference with neighboring home networks which typically have overlapping coverage. This self-selection of a channel by each network, typically results in neighboring WEAN having unique mutually exclusive channel selections thereby avoiding interference with one another.

After selection of a single channel for the associated home network, the WAP controls access to the shared communication medium using a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the line is in use.

Communications on the single communication medium are identified as "Simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

What is needed is an improved method of operating a WLAN.

SUMMARY OF THE INVENTION

The present invention provides a method and apparatus for managing wireless local area networks (WLAN) each supporting wireless communications between an associated access point node and associated station nodes on a corresponding one of a plurality of communication channels. The apparatus comprises a geolocation utilization manager for aggregating channel utilization information from the WLANs, and consolidating channel usage between neighboring underutilized ones of the WLANs, thereby maximizing utilization of a shared channel between neighboring underutilized ones of the WLANs and freeing up other communication channels across an available spectrum. Whereby underutilized neighboring networks otherwise utilizing unique channels instead share a single channel.

The invention may be implemented in hardware, firmware or software.

Associated methods and means are also claimed.

BRIEF DESCRIPTION OF THE DRAWINGS

These and other features and advantages of the present invention will become more apparent to those skilled in the art from the following detailed description in conjunction with the appended drawings in which:

FIG. 1 is a network diagram showing overlapping coverage regions between neighboring WLAN and the prior art self-selection of unique channels to avoid interference;

FIGS. 2A, 2B, 2C are network, data structure, and network diagrams respectively showing an embodiment of the current invention with channel sharing between under-utilized neighboring WLAN;

FIGS. 3A, 3B, 3C are network, data structure, and network diagrams respectively showing an other embodiment of the current invention with channel sharing between highly-utilized neighboring WLAN with isolated communication links;

FIGS. 3D, 3E, 3F are network, data structure, and network diagrams respectively showing an other embodiment of the current invention with channel sharing between highly-utilized neighboring home WLAN with isolated communication links;

FIG. 7 is a process flow diagram of processes associated with managing WLAN.

DETAILED DESCRIPTION OF THE EMBODIMENTS

Figure 3A:
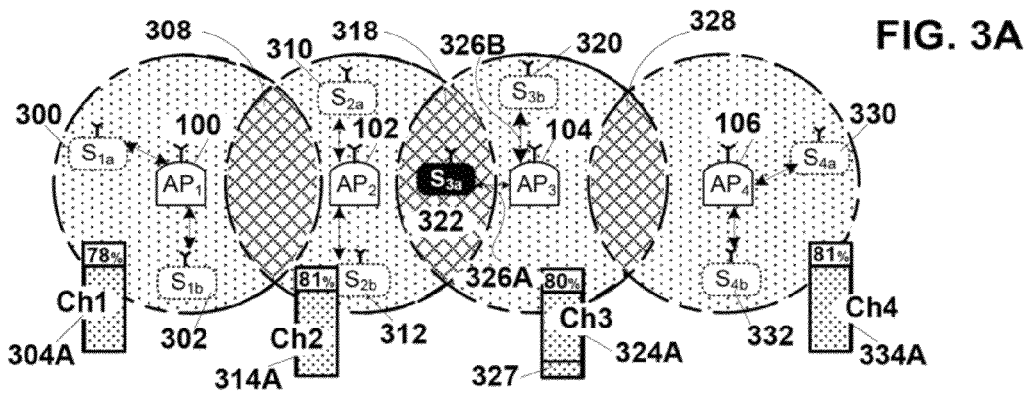

The present invention provides a method and apparatus for managing wireless local area networks (WLAN), whereby underutilized neighboring WLANs otherwise utilizing unique channels instead share a single channel, thereby freeing up other communication channels across an available WiFi, IEEE 802.11 or other such spectrum.

FIG. 1 is a network diagram showing overlapping coverage regions between neighboring WLAN and the prior art self-selection of unique channels for each network which avoids interference there between. Wireless access points (WAP) 100, 102, 104 and 106 are shown with overlapping coverage areas. Upon detection of the service set identifiers (SSID) in the beacon of their immediate neighboring wireless networks each WAP self-selects a channel which avoids interference with neighboring networks. This prior art approach to channel selection tends to result in neighboring home networks each selecting channels which are unique with respect to other neighboring networks. In FIG. 1: WAPs 100, 102, 103, 104 have self-selected channels 1, 2, 3 and 4 respectively.

FIGS. 2A, 2B, 2C are network, data structure, and network diagrams respectively showing an embodiment of the current invention with channel sharing between under-utilized neighboring WLAN. An under-utilized network is a network with has significant available airtime on the associated channel. If the available airtime is large enough a single channel can be shared between two or more neighboring networks. The networks still have unique SSIDs with respect to one another, and the communications within the devices of each network are distinct from, discrete and secure with respect to the other networks sharing the channel. The only difference is that after sharing commences, the channel is no longer under-utilized, rather it is highly-utilized at an aggregate level, with portions of airtime consumed by each of the neighboring networks sharing the channel.

In FIG. 2A the neighboring networks formed by WAPs 100, 102, 104 and 106 are shown with the same unique channel assignments discussed in the prior figure. The distinction in this case, is that channel utilization information in the form of the amount of airtime used by each network on its associated channel is available. WAP 100 is using 13% of the available airtime on Channel 1 as shown in the stacked bar 200A. WAP 102 is using 18% of the available airtime on Channel 2 as shown in the stacked bar 202A. WAP 104 is using 14% of the available airtime on Channel 3 as shown in the stacked bar 204A. WAP 106 is using 77% of the available airtime on Channel 4 as shown in the stacked bar 206A.

FIG. 2B shows the aggregation 210 of the channel utilization information from the neighboring networks in a single utilization table 212. The channel utilization information in this embodiment includes the current channel utilized by each network, the amount of used or available airtime on the channel, the number of station nodes comprising each network, and the SSIDs of neighboring networks the signals of which overlap with each network. After aggregation of channel utilization for each network the networks with underutilized channels 214 are identified. Underutilized channels are channels with significant unused and therefore available airtime.

Additionally, the relative or actual locations of the networks can be determined from the Channel Utilization information such as: the SSIDs of neighboring networks, the global positioning system (GPS) data of each WAP, or from information as to the address the subscriber associated with each network. From the location and channel utilization information, neighboring under-utilized WLAN can be identified.

Next channel utilization is revised as shown in table 216 so that underutilized neighboring networks share 218 the same channel, thereby increasing the utilization of the selected shared channel. The shared usage of airtime on Channel 1 between networks associated with WAP 100 and neighbor 102 results in combined utilization of 31% as shown in bar 200B for their regions of overlapping coverage. The shared usage of airtime on Channel 1 between networks associated with WAP 102 and neighbors 100, 104 may result in combined utilization of 55% as shown in bar 202B for their regions of overlapping coverage. The shared usage of airtime on Channel 1 between WAP 104 and neighbor 102 results in combined utilization of 32% as shown in bar 204B for their regions of overlapping coverage. Channel sharing is avoided on the highly-utilized one of the networks 106 as shown in bar 206B which utilizes a different channel 4 for wireless home network communications.

In another embodiment of the current invention, each network is setup up for optimal utilization at startup, using pre-aggregated data about each network, thus avoiding the sub-optimal channel allocation shown in FIG. 2A.

Figure 3C:
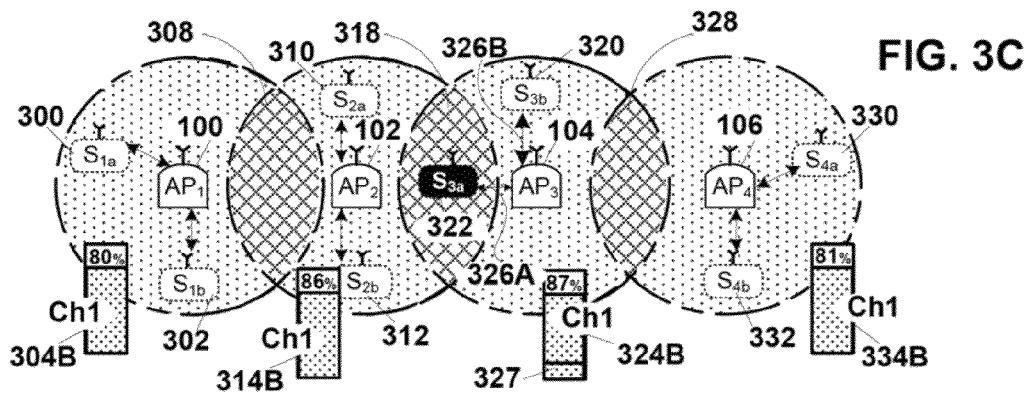

FIGS. 3A, 3B, 3C are network, data structure, and network diagrams respectively showing an other embodiment of the current invention with offers additional improvements in channel utilization. Channel sharing can also take place even between highly-utilized neighboring WLAN provided only that the communication links thereof are isolated from one another. Isolation can arise either from the location or traffic flow of the devices which form a link. FIG. 3A shows one such case.

In FIG. 3A the networks formed by WAPs 100, 102, 104 and 106 are shown to have little unused airtime and thus are highly-utilized. The overall channel utilization for the network formed by WAP 100 and associated station nodes 300 and 302 is 78% as shown in bar 304A. The overall channel utilization for the network formed by WAP 102 and associated station nodes 310 and 312 is 81% as shown in bar 314A. The overall channel utilization for the network formed by WAP 104 and associated station nodes 320 and 322 is 80% as shown in bar 324A. The overall channel utilization for the network formed by WAP 106 and associated station nodes 330 and 332 is 81% as shown in bar 304A.

FIG. 3A also shows the communication links formed between the devices within a network, e.g. a WAP-station link or a station-station link. Links 326A, 326B between WAP 104 and stations 322 and 320 respectively are shown. Except for station 322, no other station is located so as to extend the overlapping WAP coverage regions 308, 318, 328 between the adjacent networks. Thus all communication links, except the link between station 322 and WAP 104, are isolated from links within adjacent network(s).

FIG. 3B shows the aggregation of the channel utilization information from the neighboring networks in a single utilization table for each network. Utilization table 340 for the network formed by WAP 104 is shown. The channel utilization information in this embodiment is detailed enough to allow control of channel sharing between adjacent networks even if each network is highly-utilized by its own internal devices. The utilization table includes individual records for each device type, showing the actual or expected utilization, the number of nodes, the node type e.g. DVL Player, cell phone, printer, smoke detector, notebook computer or television, the breakdown of utilization i.e. Transmit or Receive, the quality of service (QOS) required by the device, e.g. high, medium or low, and the SSIDs of the WAP as well as the SSIDs of neighboring networks to which either the WAP or its associated stations are exposed. Records 342 and 344 for stations 322 and 320 respectively are shown. Record 342 identifies the station type as a single printer with an actual or expected utilization of 5% and with a highly asymmetric data flow primarily into the printer as a receiver. The QOS requirements are low, meaning any given data flow to the printer can be significantly delayed. Record 344 identifies the station type as a single notebook computer with an actual or expected utilization of 75% with a symmetric data flow. The QOS requirements are medium.

Additionally, in this embodiment of the invention, the channel utilization table for each network includes a radar utilization record 346 which shows which channels have been identified by WAP 104 as having active radar. In the example shown those channels are Channels 4 and 6. Such information arises anytime a WAP tries to discover and setup another channel for sustaining network communications. Discovery, in the case of targeting a channel that might have active radar, requires ceasing network communications on the existing channel and passively observing the targeted channel for 1 minute. If during the observation interval active radar is detected, then the channel can not be used. The discovery process is very time consuming and disrupts the existing network communications. In an embodiment of the current invention, however, the aggregated radar records of each network can be used to determine whether a channel is exposed to active radar or not and to disseminate that consensus determination to all WLANs. In an embodiment of the invention this consensus view can be used to avoid discovery attempts by a WAP for channels already determined to have active radar. Alternately, this radar consensus view can be used to negate a radar discovery of single WAP where neighboring WAPs do not detect radar. The determination itself can be based either on a single reported instance of radar on a given channel from a single WLAN or on a weighted consensus of the statistics from more than one WLAN. The radar determinations can be relied on during either channel discovery or channel monitoring phases of operation of a WAP.

After aggregation of channel utilization for each network the relative or actual locations of the networks and further the devices within each network can be determined from the Channel Utilization information. If SSIDs of neighboring networks can be aggregated from both the WAP and stations of each network then at least the relative locations of the devices within each network can also be determined. Similar location determinations can be made with GPS data supplied from both the WAP and stations of each network. Additional channel utilization information such as beamforming vectors associated with multiple-input multiple-output (MIMO) links between each WAP and its associated stations can also be used to resolve the relative or actual location of each network and devices thereof. Once the utilization and location determinations are made the neighboring highly-utilized networks with isolated links can be identified.

FIG. 3C shows a possible revision to channel utilization by the networks resulting from the aggregation and evaluation of channel utilization data from each of the networks. The shared usage of airtime on Channel 1 between networks associated with WAP 100 and neighbor 102 results in combined utilization of 81% as shown in bar 304B for their regions of overlapping coverage. The shared usage of airtime on Channel 1 between networks associated with WAP 102 and neighbors 100, 104 may result in combined utilization of 86% as shown in bar 314B for their regions of overlapping coverage. The shared usage of airtime on Channel 1 between WAP 106 and neighbor 104 results in combined utilization of 81% as shown in bar 334B for their regions of overlapping coverage.

Additionally, due to the extremely low utilization requirements of station 322, the non-isolated link formed thereby, does not preclude channel sharing for the network formed by WAP 104. The shared usage of airtime on Channel 1 between WAP 104 and neighbor s 102, 106 results, even with the exposed link 322, in an acceptable combined utilization of 87% as shown in bar 324B for their regions of overlapping coverage.

In another embodiment of the current invention, each network is setup up for optimal utilization at startup, using pre-aggregated data about each network, thus avoiding the sub-optimal channel allocation shown in FIG. 3A.

FIGS. 3D, 3E, 3F are network, data structure, and network diagrams respectively showing an other embodiment of the current invention with offers additional improvements in channel utilization. Channel sharing between highly-utilized neighboring WLAN can take place when links are isolated not by virtue of their location as shown in the prior series of figures but instead by the direction of traffic flow between devices which form a link. FIG. 3D shows such a case.

In FIG. 3D the networks formed by WAPs 100, 102, 104 and 106 are shown to have little unused airtime and thus are highly-utilized. The overall channel utilization for the network formed by WAP 100 and associated station nodes 350 (wireless DVD player) and 352 (wireless TV) is 78% as shown in bar 354A. The overall channel utilization for the network formed by WAP 102 and associated station nodes 360 (TV) and 362 (DVD player) is 81% as shown in bar 364A. The overall channel utilization for the network formed by WAP 104 and associated station nodes 370 (TV) and 372 (DVD player) is 82% as shown in bar 374A. The overall channel utilization for the network formed by WAP 106 and associated station nodes 380 (DVD player) and 382 (TV) is 81% as shown in bar 384A.

FIG. 3D also shows the communication links formed between the devices within a network, e.g. wireless DVD players and Televisions. The TV's are receivers of data and thus are passive devices/nodes which do not extend the overlapping WAP coverage regions 356, 366, 376 between adjacent networks. The DVD players, by contrast, are primarily transmitters of data and thus are active devices/nodes which do extend the associated WAP coverage regions. The communication links to TVs 352 and 360 are isolated from one another by virtue of the separation between associated DVD players 350 and 362, while the links from DVD players 372 are not isolated from one another.

FIG. 3E shows the aggregation of the channel utilization information from the neighboring networks in a single utilization table for each network. Utilization table 388 for the network formed by WAP 100 is shown. The channel utilization information in this embodiment is detailed enough to allow control of channel sharing between adjacent networks even if each network is highly-utilized by its own internal devices. The utilization table includes individual records for each device type, showing the actual or expected utilization, the number of nodes, the node type e.g. DVL Player, cell phone, printer, smoke detector, notebook computer or television, the breakdown of utilization i.e. Transmit or Receive, the quality of service (QOS) required by the device, e.g. high, medium or low, and the SSIDs of the WAP as well as the SSIDs of neighboring networks to which either the WAP or its associated stations are exposed. The channel utilization table may also include GPS data, or MIMO beamforming coordinates, or the physical address of the associated subscriber. Records 390 and 392 for stations 350 and 352 respectively are shown. Record 390 identifies the station type as a single wireless DVD player with an actual or expected utilization of 80% and with a highly asymmetric data flow primarily from the DVD player as a wireless transmitter. The QOS requirements are high, meaning any given data flow to the printer can not be delayed. Record 392 identifies the station type as a single wireless Television with an actual or expected utilization of 80% with highly asymmetric data flow primarily to the TV as a wireless receiver. The QOS requirements are high.

Additionally, in this embodiment of the invention, the channel utilization table for each network includes a radar utilization record 394 which as discussed above in connection with FIG. 3B shows which channels have been identified by the associated WAP, e.g. WAP 100 as having active radar. In the example shown those channels are Channels 4 and 6. Such information arises anytime a WAP tries to discover and setup another channel for sustaining network communications. The aggregated radar records of each network can be used to avoid repetitive discovery attempts for channels already determined to have active radar.

After aggregation of channel utilization for each network the relative or actual locations of the networks and further the devices within each network can be determined from the Channel Utilization information. If SSIDs of neighboring networks can be aggregated from both the WAP and stations of each network then at least the relative locations of the devices within each network can also be determined. Similar location determinations can be made with GPS data supplied from both the WAP and stations of each network. Additional channel utilization information such as beamforming vectors associated with MIMO links between each WAP and its associated stations can also be used to resolve the relative or actual location of each network and devices thereof. Once the utilization and location determinations are made the neighboring highly-utilized networks with isolated and non-isolated links can be identified.

FIG. 3F shows a possible revision to channel utilization by the networks resulting from the aggregation and evaluation of channel utilization data from each of the networks. The shared usage of airtime on Channel 1 between networks associated with WAP 100 and neighbor 102 results in combined utilization of 83% as shown in bar 354B for their regions of overlapping coverage. The shared usage of airtime on Channel 1 between networks associated with WAP 102 and neighbor 100 results in combined utilization of 84% as shown in bar 3646 for their regions of overlapping coverage. WAP 104 does not share a channel with its neighbors, because it's channel is highly utilized internally, and further because the links between DVD players 372 and 374 and their associated TVs are not isolated from one another physically. Therefore a unique channel with respect to its neighboring networks is selected for WAP 104, i.e. Channel 3. The utilization of Channel 3 by the network formed by WAP 104 remains at 82%. Similarly, the utilization of Channel 1 by the network formed by WAP 106 remains at 81%.

In another embodiment of the current invention, each network is setup up for optimal utilization at startup, using pre-aggregated data about each network, thus avoiding the sub-optimal channel allocation shown in FIG. 3D.

Figure 4A:
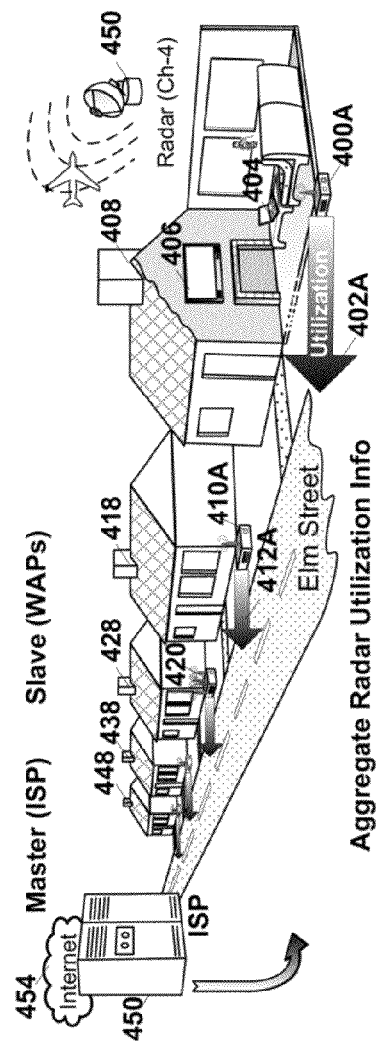
FIGS. 4A, 4B, 4C are network plan view, data structure, and network elevation views respectively showing still an other embodiment of the current invention with aggregation and dissemination of radar utilization information between networks.
Figure 4C:
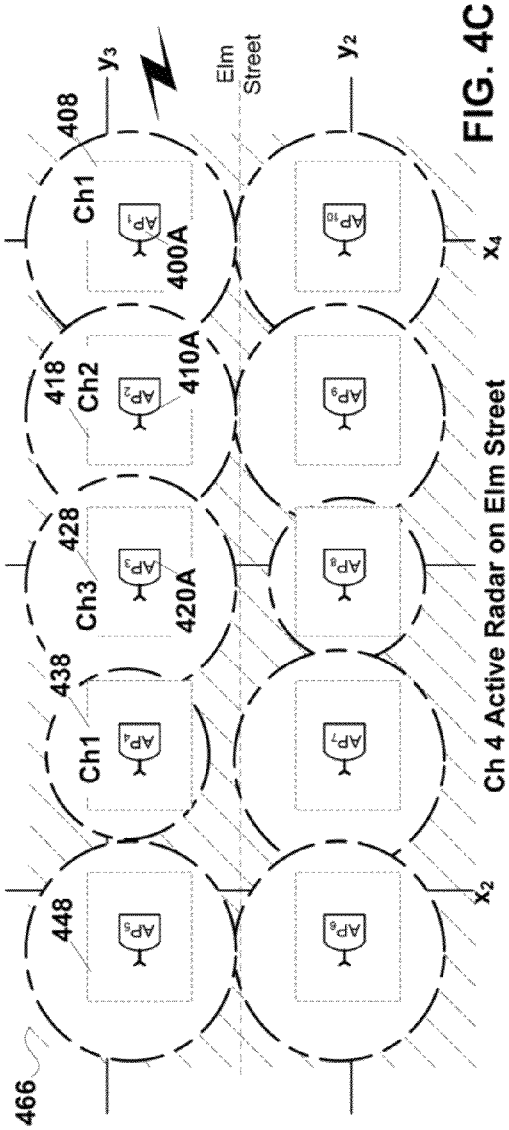
Figure 4B:
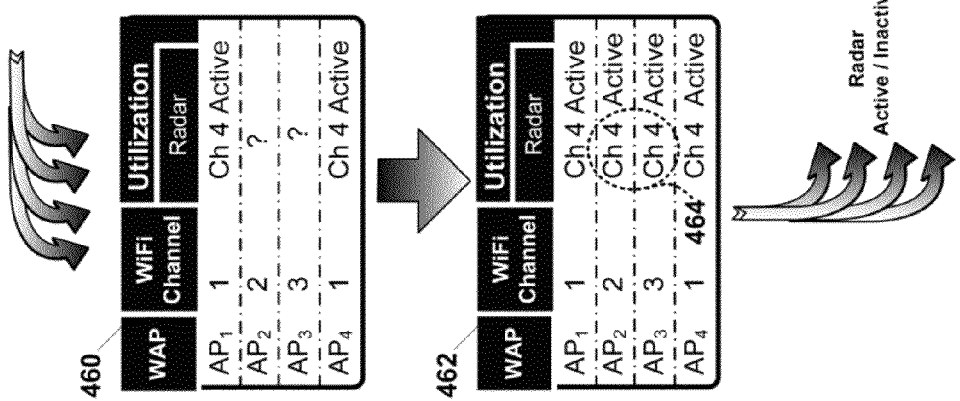

FIGS. 4A, 4B, 4C are network plan view, data structure, and network elevation views respectively showing still an other embodiment of the current invention with aggregation and dissemination of radar utilization information between WLAN.

FIG. 4A is a plan view of the homes 408, 418, 428, 438, 448 on "Elm Street". There is an airport nearby which has radar 450 operating in the spectrum assigned to wireless channel 4. Each home has an associated WAP and station nodes. WAP 400A supports a wireless network in home 408 comprising a notebook computer 404 enabled for wireless local area network (WLAN) and a TV 406 also supporting WLAN connectivity. WAP 400A is configured to export channel utilization information 402A to an Internet Service Provider (ISP) 450 coupled to Internet 454. WAP 410A supports a wireless home network in home 418, and also exports channel utilization information 412A to the ISP 450. WAP 420A supports a wireless home network in home 428, and also exports channel utilization information to the ISP.

FIG. 4B shows a redacted table 460 with the channel utilization information collected from the WAPs on Elm Street. The table shows the selected channel for each network as well as the channels on which active radar has been detected. In the example shown only two of the 4 reporting WAPs have detected active radar on Channel 4. Using the aggregated information, in this case the radar utilization detected by each WAP, the aggregating entity, e.g. ISP 450, generates a revised table 462 with revisions 464 which will enable the information as to active radar utilization to be disseminated to all WAPs on Elm Street, including those which have not independently detected radar on Channel 4 in the Elm Street neighborhood.

FIG. 4C shows a geolocation radar map generated by the ISP which identifies networks exposed to radar and the associated radar channel(s) to avoid, i.e. Channel 4. Radar coverage is shown in cross-hatch 466. Homes 408, 418, 428, 438, 448 are shown. This table or information corresponding to all or part thereof can be distributed by the ISP to each associated WAP, thereby allowing the aggregation and dissemination of radar information between networks. The aggregation and dissemination of radar records among neighboring networks avoids time consuming and duplicative channel discovery attempts for channels determined to have active radar. In an embodiment of the invention the aggregation and dissemination of radar records can be used by individual WAPS to quality their in service radar detection.

In the embodiment shown the aggregating entity is the ISP which has a master-slave relationship to the WAPs with the ISP aggregating channel utilization information from the WAPs and assigning or revising channel selections therefore. In an embodiment of the invention the master can supplement aggregated information with resident lookup tables showing the number and types of devices in a subscriber's WLAN or the location of a subscriber's WLAN. The following FIGS. 5B, 5C show alternate system level architectures.

Figure 5A:
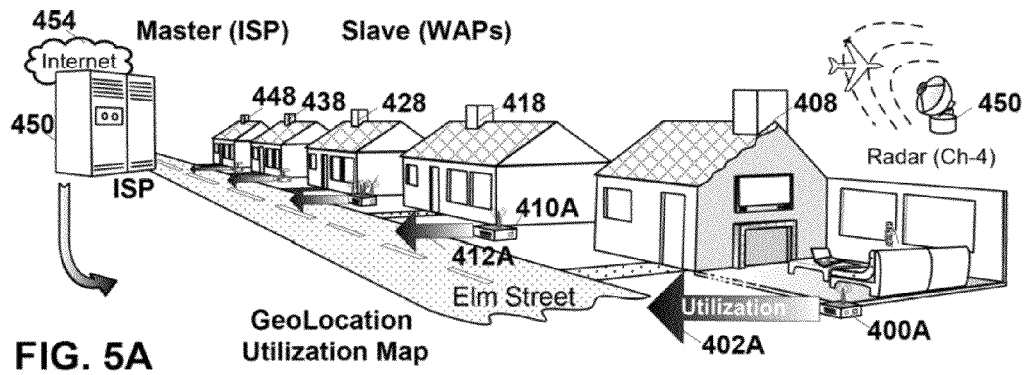
FIGS. 5A, 5B, 5C are network elevation views showing distinct embodiments of the invention for managing neighboring WLAN.
Figure 5B:
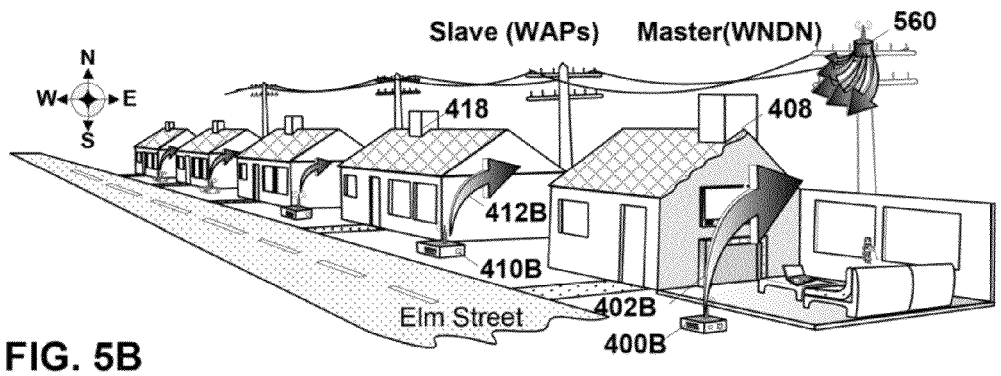
Figure 5C:
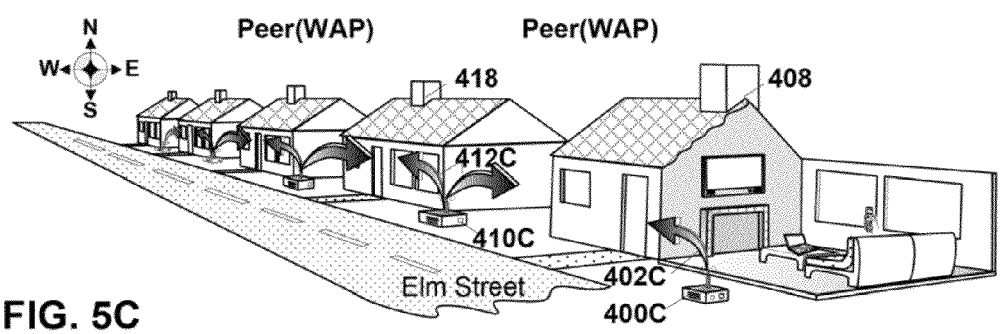

FIGS. 5A, 5B, 5C are network elevation views showing distinct embodiments of the invention for managing neighboring WLAN.

FIG. 5A is a plan view of the homes 408, 418, 428, 438, 448 on "Elm Street". There is an airport nearby which has radar 450 operating in the spectrum assigned to wireless channel 4. Each home has an associated WAP and station nodes. WAP 400A supports a wireless network in home 408 comprising a notebook computer enabled for wireless local area network (WLAN) and a TV also supporting WLAN connectivity. WAP 400A is configured to export channel utilization information 402A to the Internet Service Provider (ISP) 450 coupled to Internet 454. WAP 410A supports a wireless home network in home 418, and also exports channel utilization information 412A to the ISP 450. In the embodiment shown the aggregating entity is the ISP which has a broadband wire line coupling to each WAP. In addition to providing Internet access, the ISP has a master-slave relationship to the WAPs with the ISP aggregating channel utilization information from the WAPs and assigning or revising channel selections therefore.

FIG. 5B is an alternate plan view of the homes on "Elm Street" of which homes 408, 418 are referenced. Each home again has an associated WAP and station nodes. WAP 400A supports a wireless network in home 408 comprising a notebook computer enabled for wireless local area network (WLAN) and a TV also supporting WLAN connectivity. WAP 400B is configured to wirelessly export channel utilization information 402B to an aggregating entity, which in this embodiment of the invention is a wireless network distribution node (WNDN) 560 mounted on a telephone pole on Elm Street. WAP 410B supports a wireless home network in home 418, and also wirelessly exports channel utilization information 412B to the WNDN 560. In the embodiment shown the aggregating entity is the WNDN which has a wireless coupling to each WAP for data distribution and for aggregating and assigning or revising channel selections for the neighboring WAPs to which it is coupled. In addition to providing Internet access, the WNDN has a master-slave relationship to the WAPs with the WNDN aggregating channel utilization information from the WAPs and assigning or revising channel selections therefore.

FIG. 5C is an alternate plan view of the homes on "Elm Street" of which homes 408, 418 are referenced. Each home again has an associated WAP and station nodes. WAP 400C supports a wireless network in home 408 comprising a notebook computer enabled for WLAN and a TV also supporting WLAN connectivity. WAP 400C is configured to wirelessly export channel utilization information 402C to and from neighboring WAPS which in this case is the neighboring homes. WAP 410C supports a wireless home network in home 418, and also wirelessly exports channel utilization information 412C to neighboring WAPs. In the embodiment shown each WAP operates on a peer-to-peer basis with adjacent WAPs performing overlapping functions of disseminating and aggregating channel utilization information to/from neighbors and assigning or revising a self channel selection based on the aggregated information.

Figure 6A:
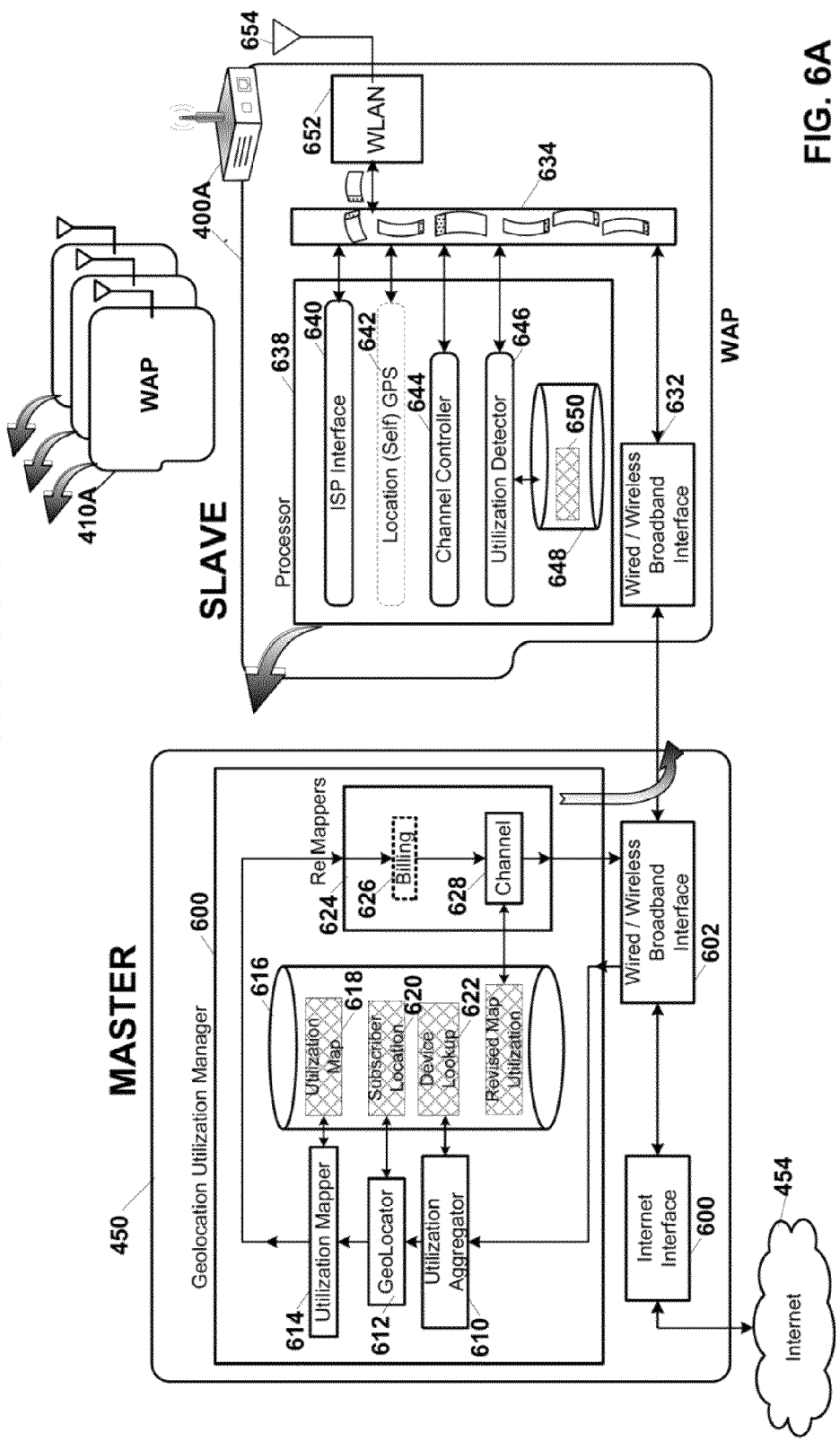
FIGS. 6A, 6B are hardware block diagrams showing master-slave and peer-to-peer embodiments respectively for managing neighboring WLAN.
Figure 6B:
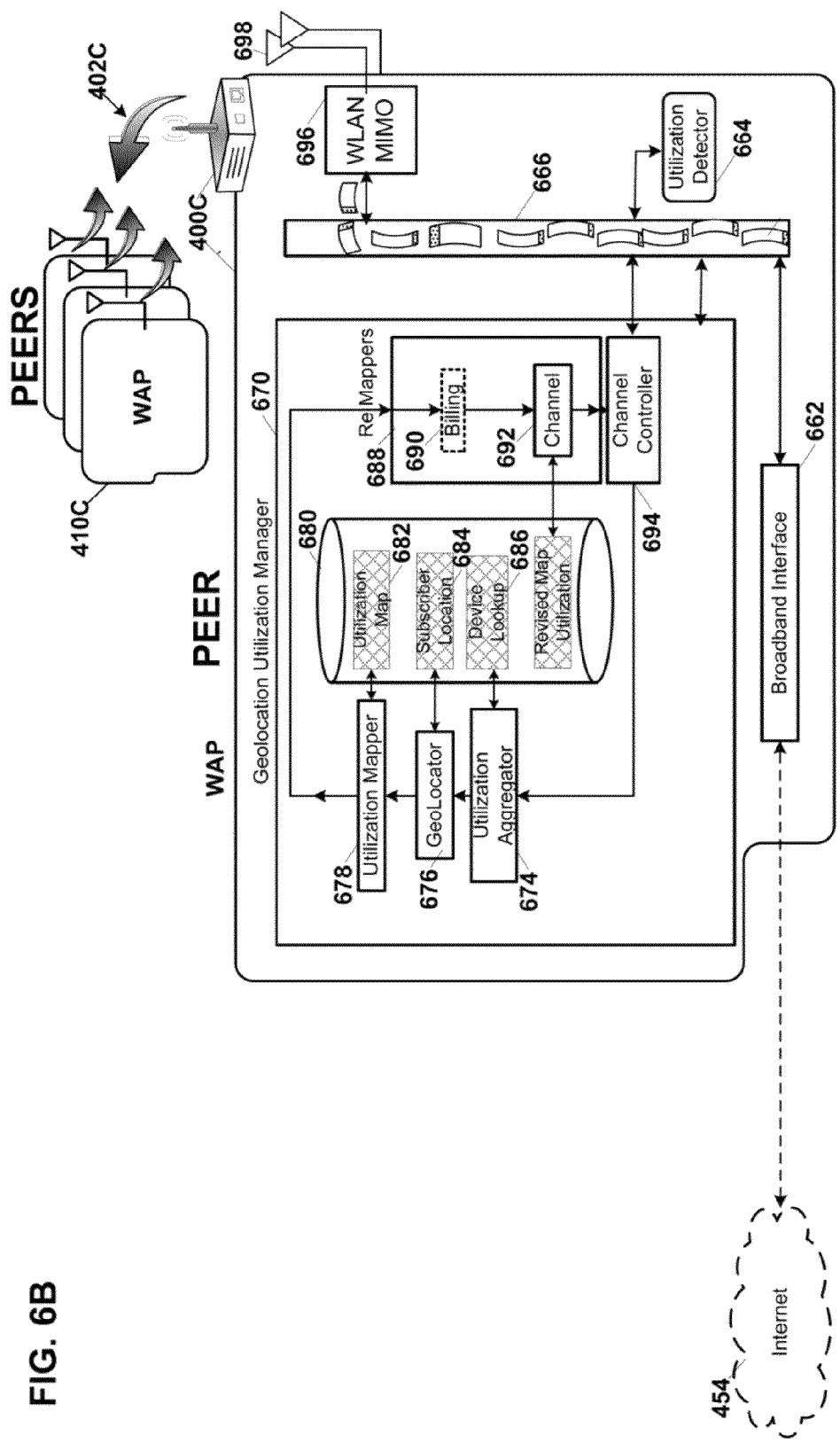

FIGS. 6A, 6B are hardware block diagrams showing master-slave and peer-to-peer embodiments respectively for managing neighboring WLAN.

In FIG. 6A, ISP 450 (See FIG. 4A) acts as the master aggregating entity for channel utilization information from the slave WAPs including WAPS 400A and 410A. A representative WAP 400A is shown. WAP 400A includes a wired or wireless broadband interface 632 for coupling to the ISP. A packet based bus 634 couples the broadband interface, a processor 638, and a wireless local area network (WLAN) stage 652 to one another. The WLAN stage has an antenna 654. In alternate embodiments of the invention the WLAN stage has multiple antennas supporting, multiple-input multiple-output (MIMO) wireless communications and may include support for diversity and beam forming.

The processor 638 of WAP 400A is configured to support an ISP interface 640 for communications with the ISP; an optional global positioning (GPS) capability 642 for precisely locating the WAP; a channel controller 644 for accepting channel assignments/revisions from the ISP; and a utilization detector 646 coupled to storage 648 for detecting channel utilization information 650 and uploading same to the ISP 450. The utilization information provided by the utilization detector in an embodiment of the invention includes actual and or estimated airtime usage as a fraction or percent of total airtime on the corresponding channel. Airtime usage may be provided exclusively for the WAP or in another embodiment of the invention for the WAP and all station nodes forming the associated WLAN, or in still another embodiment of the invention for each link within an associated WLAN. Information as to airtime usage at a link level can include node identifiers as well, e.g. station or WAP identifiers. In another embodiment of the invention the utilization information provided by the utilization detector includes: the type of wireless stations which make up the associated network; e.g. computers, printers, televisions, digital video (DVD) players and smoke detectors. This information as to the type of devices comprising each network can be used to estimate the airtime utilization requirements of the network. In another embodiment of the invention the utilization information provided by the utilization detector includes: self and neighboring service set identifiers (SSID) and or multiple-input multiple-output (MIMO) data and or GPS data from the optional GPS system 642. The SSIDs of the wireless local area network (WLAN) as well as SSID(s) for neighboring networks can be used to map the relative locations of neighboring networks and the nodes thereof, as well as identify any nodes of one network that are isolated from those of a neighboring network. Further refinements in location can be achieved when MIMO spatial data and or GPS data is available from which two or three dimensional maps of each network can be abstracted. In still another embodiment of the invention the utilization information provided by the utilization detector includes radar information as to channels identified during the network setup phase as having active radar.

The ISP 450 includes an Internet 454 interface 600 coupled to a wired or wireless broadband interface 602, and a geolocation utilization manager 600. The geolocation utilization manager aggregates channel utilization information from multiple wireless local area networks (WLAN), identifies actual or estimated usage and location of each WLAN and disseminates channel assignments/selections which optimize channel utilization via channel sharing between neighboring underutilized WLANs. A network is said to be underutilized when its data throughput requirements fall substantially below the available data throughput capacity of the associated channel. The geolocation manager consolidates channel assignments to a single shared channel between neighboring underutilized WLAN. After consolidation the shared channel utilization increases to satisfy the aggregate data requirements of the two or more underutilized neighboring networks but the increase does not exceed an acceptable upper/maximum utilization level for the shared channel.

The geolocation utilization manager includes a utilization aggregator 610, a geolocator 612, a utilization mapper 614, storage 616, and a re-mapper 624. In operation the utilization aggregator aggregates the uploaded channel utilization information from each WAP. Where the channel utilization information is limited solely to device types for all the stations of each WAPs network, the utilization aggregator may utilize a stored device type lookup table 622 to determine expected total channel utilization requirements for each network. The geolocator determines either relative or actual locations for each WAP using channel utilization information including: address, SSIDs of each WAP and the visible neighbors or GPS data for example. In an embodiment of the invention the geolocator also determines the relative or actual location in two or three dimensional space of each station of each network using the above data and also any available MIMO spatial positioning data. In an other embodiment of the invention the geolocator correlates a subscriber address with an associated wireless home network location using a subscriber address lookup table 620. The utilization mapper 614 uses the utilization and location information to map 618 the location and utilization of all aggregated WLAN and identifies neighboring under-utilized networks or networks with isolated links. Next, the re-mapper 624 revises the channel assignments based on the actual or projected usage and location of each WLAN, so as to increase the utilization of one or more channels by sharing the channel between neighboring networks. The channel assignments 628 are then disseminated to each wireless home network via the broadband interface 602. In an embodiment of the invention channel re-mapping is based both on channel utilization information together with billing profiles of associated subscriber's for each WLAN. In this embodiment of the invention the remapper uses a subscriber billing lookup table 626 to associate each WLAN with a subscriber billing profile. Billing profiles would indicate which subscribers were paying more for their WLAN service, e.g. Internet access. For example in an embodiment of the invention, subscribers purchasing a "Premium" data plan could expect higher upload and download speeds and corresponding higher subscription price than subscribers purchasing a "Basic" data plan. In another embodiment of the invention, subscribers purchasing a "Premium" data plan would get video content and or quality not available to "Basic" data subscribers. The remapper in this embodiment of the invention incorporates billing profiles into the remapping decision. In this embodiment of the invention neighboring underutilized WLANs associated with basic data plan subscribers are more likely to be subject to channel sharing than are neighboring underutilized WLANs having at least one associated premium data plan subscriber. The overall effect of this embodiment of the invention is that networks associated with subscribers paying a lower monthly fee are more likely to be assigned a shared communication channel than are networks associated with subscribers paying a relatively higher monthly fee.

In FIG. 6B, each WAP acts as both as an aggregating and disseminating entity for channel utilization information with neighboring WAPs. In this peer-to-peer embodiment of the invention WAPS 400C and 410C are shown (See FIG. 5C) A representative WAP 400C is shown in greater detail. WAP 400C includes a wired or wireless broadband interface 662 for coupling to the Internet 454. A packet based bus 666 couples the broadband interface, a geolocation utilization manager 670, a utilization detector 664 and a wireless local area network (WLAN) stage 696 to one another. The WLAN stage may have one or more antennas 698. In an embodiment of the invention the WLAN stage has multiple antennas supporting, multiple-input multiple-output (MIMO) wireless communications and may include support for diversity and beam forming.

The utilization detector 664 couples to the geolocation manager 670 for maintaining and providing channel utilization information thereto. The channel utilization information detected by the utilization detector as discussed above includes: airtime usage, device types, self and neighboring SSIDs and active Radar. The geolocation utilization manager aggregates channel utilization information from multiple neighboring wireless local area networks (WLAN), identifies usage and location of each WLAN and disseminates channel assignments/selections which optimize channel utilization via channel sharing between neighboring underutilized WLANs. The consolidation of channel selections between neighboring underutilized networks not only optimizes use of the channel but also of the entire available spectrum, by freeing up channels for higher throughput, higher paying WLAN subscribers, for example. This in turn encourages new revenue and billing models from Internet Service Providers (ISP)s and Telcos which support differentiated service levels.

The geolocation utilization manager includes a channel controller 644 for controlling both peer-to-peer communications as well as normal wireless network communications on a selected channel. The geolocation utilization manager also includes a utilization aggregator 674, a geolocator 676, a utilization mapper 678, storage 680, and a re-mapper 688. In operation the utilization aggregator aggregates the channel utilization information 402C from each neighboring WAR Concurrently the channel controller disseminates the channel utilization information from the utilization detector 664 to neighboring WAPS. Where the channel utilization information is limited solely to device types for all the stations of each WAPs network, the utilization aggregator may utilize a stored device type lookup table 686 to determine expected total channel utilization requirements for each network. The geolocator determines either relative or actual locations for each neighboring WAP using channel utilization information including: address, SSIOs of each WAP and the visible neighbors or aggregated global positioning system (GPS) data for example. In an embodiment of the invention the geolocator also determines the relative or actual location in two or three dimensional space of each station of each neighboring network using the above data and also any available MIMO spatial positioning data. In an other embodiment of the invention the geolocator correlates a subscriber address with an associated wireless home network location using a subscriber location lookup table 684. The utilization mapper 678 uses the utilization and location information to map 682 the location and utilization of all aggregated WLAN and identifies neighboring under-utilized networks or networks with isolated links. Next, the re-mapper 688 revises the channel assignments to increase the utilization of one or more channels by sharing the channel between neighboring networks. The channel assignments 692 are then disseminated to each wireless home network via the wireless link 402C. In an embodiment of the invention where channel re-mapping is correlated with a subscribers billing profile, e.g. "Premium data plan" or "Basic data plan" the remapper uses a subscriber billing lookup table 690 to determine whether or not to assign a shared channel to a given subscriber's associated wireless home network. In accordance with this embodiment of the invention a subscriber with a "basic" data plan subscription is more likely to share a channel with a neighboring wireless home network than a subscriber with a "Premium" data plan.

FIG. 7 is a process flow diagram of processes associated with managing WLAN. In the first processing stage 700 channel utilization is determined among the WLAN. The stage commences with a determination in decision process 702 as to the methodology for sharing channel utilization information. If a pull methodology is utilized processing commences with process 710. In process 710 channel utilization information is aggregated for a plurality of WLAN. The aggregation may include aggregation between WAPs as peers to one another or between an ISP and WAPs in a master-slave relationship. Channel utilization information includes for example: node utilization, node type, service set identifiers (SSID) of the associated wireless home network together with SSIDs of neighboring WLAN detected thereby, GPS location, and radar activity. Next in process 712 the actual or estimated utilization level of each wireless home network is determined based on the aggregated channel utilization information. In the following process 714 the geolocation of the WLAN takes place. The actual or relative locations of the WLAN are determined using the aggregated channel utilization information such as: the service set identifiers (SSID) of the associated wireless home network together with SSIDs of neighboring wireless home networks detected thereby; GPS data, MIMO data, or relatively in a peer-to-peer embodiment of the invention by the wireless receipt of channel information from a neighboring network. Next in process 716 channels on which active radar has been detected are identified. Next in process 720 a current utilization map is creates showing the location and utilization of each wireless home network as well as any regions of overlapping coverage with neighboring WLAN.

If alternately in decision process 704 a determination is made that management of WLAN involves a push methodology then control passes to process 704. In process 704 utilization levels are assigned to each wireless home network based on either a corresponding subscriber's data plan, e.g. "Premium" or "Basic" or based on prior usage. Subsequently in process 706 the geolocation of the WLAN takes place with the actual locations of each network determined based on correlating each network with a corresponding subscriber's address. Next In process 708 channels exposed to active radar are identified from a $3^{rd}$ party service. Next in process 720 a current utilization map is creates showing the location and utilization of each wireless home network as well as any regions of overlapping coverage with neighboring WLAN.

A hybrid path for determining channel utilization is shown directly from decision block 702 to process 720. This path incorporates various mixes of the push and pull processes discussed above. In this embodiment of the invention both aggregated utilization information as well as a subscriber's billing profile might be used to determine the utilization level of an associated network.

In the second processing stage 750 channel sharing between neighboring WLAN is used to maximize utilization of each channel. The stage commences with process 752 in which networks exposed to active radar are identified along with the channels which such radar is active, and which therefore should not be selected let alone shared. Next in process 754 neighboring WLAN with low-levels of channel utilization, a.k.a. under-utilized channels, are identified. Next in process 756 neighboring WLAN with high-levels of channel utilization, a.k.a. highly-utilized channels, and isolated communication links are identified. Then in process 758 the combined utilization levels resulting from channel sharing of a new or currently selected channel are estimated for neighboring networks that are either under-utilized or have isolated communication links. If the combined utilization levels of the neighboring WLANs do not exceed the capacity of the shared channel then channel consolidation to a single shared channel is appropriate. In an embodiment of the invention such determination involves summing the airtime usage of the neighboring WLANs, where airtime usage is expressed as a percent or fraction, and consolidating channel usage if the sum is less than unity, 100% or 1. In optional following process 760 the degree of channel sharing as determined for example by acceptable upper utilization limits for shared channels is correlated with the associated subscribers' billing profiles to assure that "basic" data plan subscribers with low data rates are more likely to share a channel with a neighboring network than are subscribers with a "premium" data plan. Subscriber's having a "premium" data plan subscription associated with relatively higher data rates would be less likely to be characterized as having underutilized networks and thus less likely to share a communication channel with a neighboring WLAN. Conversely, neighboring subscribers all having "basic" data plans with relatively lower data rates would be more likely to be characterized as having underutilized networks and thus more likely to share a communication channel with neighboring WLAN.

Finally in process 762 channel selections or assignments are revised for under-utilized neighboring WLAN or neighboring WLAN with isolated communication links, responsive to an estimation of combined utilization below a maximum utilization level. Control then returns to process 700.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A geolocation utilization manager apparatus for managing wireless local area networks (WLANs), the geolocation utilization manager apparatus comprising:
   a utilization aggregator configured to aggregate channel utilization information from the WLANs, each supporting wireless communications between a wireless access point (WAP) node and associated station nodes on a selected one of a plurality of communication channels across an available spectrum;
   a geolocator configured to determine either relative or actual locations for each WLAN from the channel utilization information;
   a utilization mapper which uses the channel utilization information from the utilization aggregator and the locations from the geolocator to identify at least two neighboring WLANs which exhibit overlapping signal coverage with one another on at least two discrete communication channels each having available airtime; and
   a remapper configured to consolidate channel usage to a single communication channel shared between the at least two neighboring WLANs, thereby increasing airtime usage of the single shared communication channel and freeing up others of the plurality of communication channels for use by remaining ones of the neighboring WLANs.

2. The geolocation utilization manager apparatus of claim 1, further comprises:
   the remapper further configured to disseminate channel assignments which maximize the airtime usage by selective sharing of an assigned communication channel between neighboring underutilized ones of the WLANs each characterized by the available airtime, whereby combined utilization of the assigned communication channel shared between neighboring underutilized networks does not exceed a capacity of the shared assigned communication channel.

3. The geolocation utilization manager apparatus of claim 1, further comprises:
   the remapper further configured to revise channel selections among the WLANs exhibiting the overlapping signal coverage together with actual or projected combined airtime usage which does not exceed a capacity of the shared assigned communication channel, and further configured to disseminate a corresponding channel assignment to associated neighboring underutilized ones of the WLANs.

4. The geolocation utilization manager apparatus of claim 1, further comprises:
   the remapper further configured to revise channel assignments, based on the channel utilization information including unused available airtime from each of the WLANs together with billing profiles for associated subscribers, whereby WLAN subscribers paying a lower monthly fee are more likely to be assigned a shared communication channel than subscribers paying a relatively higher monthly fee for a relatively higher data rate or quality of service.

5. A method for managing wireless local area networks (WLANs), the method comprising:
   aggregating channel utilization information from the WLANs, each supporting wireless communications between a wireless access point (WAP) node and associated station nodes on a selected one of a plurality of communication channels across an available spectrum;

identifying at least two neighboring WLANs which exhibit overlapping signal coverage with one another on at least two discrete communication channels each having available airtime based on the channel utilization information aggregated in the aggregating act; and consolidating channel usage to a single communication channel shared between the at least two neighboring WLANs; thereby maximizing airtime usage of the single shared communication channel and freeing up others of the plurality of communications channels for use by remaining ones of the neighboring WLANs.

6. The method for managing the WLANs of claim 5, wherein the identifying and consolidating acts further comprise:

disseminating channel assignments which maximize the airtime usage by selective sharing of an assigned communication channel between neighboring underutilized ones of the WLANs each characterized by unused available airtime, whereby combined utilization of the assigned communication channel shared between neighboring underutilized networks does not exceed a capacity of the shared assigned communication channel.

7. The method for managing the WLANs of claim 5, wherein the consolidating act further comprises:

revising channel assignments to each WLAN based on the channel utilization information including unused available airtime for each WLAN, together with a type of each associated subscriber's data plan, whereby 'basic' data plan subscribers are more likely to share a communication channel with respect to neighboring WLANs than a 'premium' data plan subscriber paying for a relatively higher data rate or quality of service.

8. The method for managing the WLANs of claim 5, wherein the aggregating and identifying acts further comprise:

aggregating from each of the WLANs indicia of all device types for all associated station nodes thereof;

correlating a device type of all station nodes of each of the WLANs with an estimated data requirement therefore; and estimating airtime utilization for each of the WLANs based on the number and type of station nodes and the estimated data requirement thereof in the correlating act.

9. The method for managing the WLANs of claim 5, wherein the channel utilization information aggregated in the aggregating act from each of the WLANs includes at least one of: the airtime usage; device types; self and neighboring service set identifiers (SSIDs); multiple-input multiple-output (MIMO) spatial data; global positioning system (GPS) data; and active radar data; thereby facilitating identification of neighboring underutilized networks as candidates for channel sharing.

10. The method for managing the WLANs of claim 5, wherein the aggregating, identifying and consolidating acts further comprise:

aggregating from each of the WLANs indicia of channels exposed to active radar; and avoiding selection of channels identified as exposed to the active radar in the aggregating act and promoting selection of channels not identified as exposed to the active radar in the aggregating act, thereby reducing downtime among the WLANs resulting from channel switching.

11. The method for managing the WLANs of claim 5, wherein the aggregating and identifying acts further comprise:

aggregating from each of the WLANs service set identifiers (SSIDs) of each WLAN together with SSIDs of neighboring WLANs detected thereby; and identifying neighboring ones of the WLANs based on the SSIDs aggregated in the aggregating act.

12. The method for managing the WLANs of claim 5, wherein the aggregating and identifying acts further comprises:

aggregating from each of the WLANs the channel utilization information corresponding to multiple-input multiple-output (MEMO) spatial data; and identifying at least relative locations of neighboring ones of the WLANs and associated nodes thereof based on the MEMO spatial data aggregated in the aggregating act.

13. The method for managing the WLANs of claim 5, wherein the aggregating and identifying acts further comprise:

aggregating from each wireless home network global positioning system (GPS) based location information; and identifying at least relative locations of neighboring ones of the WLANs based on the GPS based location information aggregated in the aggregating act.

14. The method for managing the WLANs of claim 5, wherein the aggregating act comprises at least one of the acts of:

aggregating the channel utilization information at an Internet Service Provider, Telco or Cable Provider operative as a master with respect to WAP nodes associated with each WLAN as slaves; and aggregating the channel utilization information on a peer-to-peer basis among neighboring WAP nodes associated with each WLAN.

15. The method for managing the WLANs of claim 5, wherein the identifying act further comprises:

correlating each of the WLANs with a geographic location of each associated subscriber; and identifying neighboring ones of the WLANs based on geographic locations correlated therewith in the correlating act.

* * * * *

UNITED STATES PATENT AND TRADEMARK OFFICE
CERTIFICATE OF CORRECTION

PATENT NO.         : 8,462,751 B1  
APPLICATION NO.    : 13/466328  
DATED              : June 11, 2013  
INVENTOR(S)        : Hossein Dehghan and Sam Heidari Page 1 of 1

It is certified that error appears in the above-identified patent and that said Letters Patent is hereby corrected as shown below:

In the Claims:

Column 16,  
In Claim 12 line 23 Please delete "(MEMO)" and insert -- (MIMO) --  
In Claim 12 line 26 Please delete "MEMO" and insert -- MIMO --

Signed and Sealed this  
Thirteenth Day of August, 2013

Teresa Stanek Rea  
*Acting Director of the United States Patent and Trademark Office*